(12) United States Patent
Delianne et al.

(10) Patent No.: US 10,193,404 B2
(45) Date of Patent: Jan. 29, 2019

(54) CLAW ROTOR WITH REDUCED CROSS-SECTION, AND ALTERNATOR COMPRISING ROTOR OF THIS TYPE

(71) Applicant: VALEO EQUIPEMENTS ELECTRIQUES MOTEUR, Créteil (FR)

(72) Inventors: Henri Delianne, Maresville (FR); Pierre-Yves Bilteryst, Brimeux (FR)

(73) Assignee: VALEO EQUIPEMENTS ELECTRIQUES MOTEUR, Creteil (FR)

( * ) Notice: Subject to any disclaimer, the term of this patent is extended or adjusted under 35 U.S.C. 154(b) by 237 days.

(21) Appl. No.: 14/651,588

(22) PCT Filed: Dec. 13, 2013

(86) PCT No.: PCT/FR2013/053072
§ 371 (c)(1),
(2) Date: Jun. 11, 2015

(87) PCT Pub. No.: WO2014/096642
PCT Pub. Date: Jun. 26, 2014

(65) Prior Publication Data
US 2015/0333578 A1     Nov. 19, 2015

(30) Foreign Application Priority Data

Dec. 19, 2012   (FR) .................................... 12 62285

(51) Int. Cl.
    *H02K 1/24*    (2006.01)
    *H02K 1/27*    (2006.01)
    (Continued)

(52) U.S. Cl.
    CPC ............. *H02K 1/243* (2013.01); *H02K 1/226* (2013.01); *H02K 1/27* (2013.01); *H02K 21/044* (2013.01)

(58) Field of Classification Search
    CPC .......... H02K 1/226; H02K 1/243; H02K 1/27; H02K 21/044
    (Continued)

(56) References Cited

U.S. PATENT DOCUMENTS 5,708,318 A * 1/1998 Fudono .................. H02K 1/243
                                                         310/263
6,404,096 B1 * 6/2002 Kometani .............. H02K 1/243
                                                         310/12.13
(Continued)

FOREIGN PATENT DOCUMENTS

DE      10153578      5/2002
EP       0515259     11/1992
(Continued)

*Primary Examiner* — John K Kim
(74) *Attorney, Agent, or Firm* — Berenato & White, LLC

(57) ABSTRACT

Rotor an alternator or alternator-starter type comprises two pole wheels including a series of axial claws having a generally trapezoidal shape that extend axially from the edge of the outer radial end of one pole wheel towards the other pole wheel. The rotor comprises an interpolar magnetic assembly in the interpolar space between a first claw of a first pole wheel and a second claw of a second pole wheel. The magnetic assembly comprises two first faces defined by first and second free ends. A side face is also provided, such that the adjacent side face faces same, the side face comprising third and fourth opposing ends between which the magnet is in contact. The side faces of the first and second claws define a reduction in cross-section from one of the free ends of the magnetic assembly extending towards a claw head end along a side facet.

21 Claims, 4 Drawing Sheets

(51) Int. Cl.
*H02K 1/22* (2006.01)
*H02K 21/04* (2006.01)

(58) Field of Classification Search
USPC .................................................. 310/156.69
IPC ............................................... H02K 1/24,1/27
See application file for complete search history.

(56) References Cited

U.S. PATENT DOCUMENTS

| | | | |
|---|---|---|---|
| 6,847,150 B2* | 1/2005 | Kometani | H02K 1/243 |
| | | | 310/263 |
| 7,420,314 B2 | 9/2008 | Fujita et al. | |
| 9,960,651 B2* | 5/2018 | Delianne | H02K 3/528 |
| 2002/0096964 A1* | 7/2002 | Kometani | H02K 1/243 |
| | | | 310/263 |
| 2006/0290232 A1 | 12/2006 | Fujita et al. | |
| 2007/0046138 A1* | 3/2007 | Ooiwa | H02K 15/03 |
| | | | 310/263 |
| 2007/0278895 A1* | 12/2007 | Kusase | H02K 21/044 |
| | | | 310/263 |
| 2009/0189472 A1 | 7/2009 | Koumura et al. | |
| 2010/0026130 A1* | 2/2010 | Kondo | H02K 21/044 |
| | | | 310/181 |
| 2010/0109466 A1* | 5/2010 | Kondo | H02K 21/044 |
| | | | 310/156.12 |
| 2015/0333578 A1* | 11/2015 | Delianne | H02K 1/226 |
| | | | 310/156.69 |

FOREIGN PATENT DOCUMENTS

| | | |
|---|---|---|
| EP | 0881756 | 12/1998 |
| EP | 1122858 | 8/2001 |
| EP | 1362404 | 8/2005 |
| EP | 2006978 | 12/2008 |
| FR | 2256572 | 7/1975 |
| FR | 2676873 | 11/1992 |
| FR | 2784248 | 4/2000 |
| FR | 2793085 | 11/2000 |
| FR | 2895165 | 6/2007 |
| FR | 2918220 | 1/2009 |

* cited by examiner

US 10,193,404 B2

CLAW ROTOR WITH REDUCED CROSS-SECTION, AND ALTERNATOR COMPRISING ROTOR OF THIS TYPE

CROSS-REFERENCE TO RELATED APPLICATIONS AND CLAIM TO PRIORITY

This application is a national stage application of International Application No. PCT/FR2013/053072 filed Dec. 13, 2013, which claims priority to French Patent Application No. 1262285 filed Dec. 19, 2012, the disclosures of which are incorporated herein by reference and to which priority is claimed.

FIELD OF THE INVENTION

The present invention relates in general to rotary electrical machines.

More specifically, the invention relates in particular to rotary machines of the alternator or alternator-starter type which are implemented in motor vehicles.

Still more specifically, the invention relates to rotary machines, the claw rotor of which comprises magnets, for example permanent magnets, such as rare earth and/or ferrite magnets.

BACKGROUND OF THE INVENTION

The rotor has a claw structure comprising magnetic assemblies and an annular excitation winding placed around the rotational shaft of the machine. The rotor consists of two magnet wheels, each comprising claws, each of which is inserted between two claws of the magnet wheel opposite. When the excitation winding is supplied electrically, the magnet wheels, which are advantageously made of ferromagnetic material, are magnetised, and south poles are thus created at the level of the claws of one of the magnet wheels, and north poles are creased at the level of the claws of the other magnet wheel.

The magnetic assemblies comprise at least one permanent magnet, and are disposed between two claws. They are used in particular to prevent leakages of the magnetic flux between the magnetic poles in the form of a claw. In fact, it has been determined that a substantial part of the magnetic flux created by the winding of the rotor passes via leakage paths, instead of passing through the air gap of the machine, and giving rise to the required induction in the poles of the stator. For this purpose, according to solutions of the prior art, magnets are placed in pairs between at least some of the consecutive claws of the magnet wheels, either by means of clips or the like, or by means of two grooves provided in one of the lateral edges of the claws between which the magnet is situated. In the second case, the magnets must fill all of the interpolar space, which increases the cost of the machine, since these magnets are expensive.

In the field, a rotor for a rotary electrical machine is already known which comprises two magnet wheels comprising a series of claws with axial orientation and a globally trapezoidal form, which extend axially from a radial projection of the outer radial end edge of the said magnet wheel, in the direction of the other magnet wheel, such that each claw of a magnet wheel is situated in the space which exists between two consecutive claws of the other magnet wheel, and comprises at least one magnetic assembly provided with at least one interpolar magnet in the interpolar space defined between a first claw of a first magnet wheel and a second claw of a second magnet wheel, the said magnet comprising laterally two first faces which are delimited by first and second free ends, the said two first faces extending respectively along first and second claws; each of the first and second claws having a head end and a lateral face, such that the adjacent lateral face is opposite, the said lateral face comprising third and fourth opposite ends between which the magnet is in contact.

A rotor of this type for a rotary electrical machine is disclosed in FR 2 793 085.

In a rotor of this type, it has been found that part of the magnetic flux created by the winding of the rotor passed via leakage paths instead of passing through the air gap defined between the outer periphery of the rotor and the inner periphery of the stator of the electrical machine. More specifically, as shown in FIG. 1a which shows a rotor according to the prior art, the magnetic assembly is arranged relative to the first and second claws such that one of the free ends of the said magnetic assembly is recessed relative to the head end of one of the two claws. In addition, the lateral faces of each of the first and second claws define a cross-section which decreases linearly, irrespective of the proximity of the magnet which is adjacent to them.

As represented in FIG. 1a in which the reference 1 designates the claw rotor, and the reference 2 designates the rotor shaft, these leakages of magnetic flux take place in the location of the interpolar space, in the vicinity of the free end of the magnetic assembly, which is recessed relative to the head end, or free end, of one of the two claws. The leakages are caused mainly by the fact that part of the interpolar space is left free, thus putting the lateral faces of the first and second claws directly opposite one another. In addition, the geometry of the head end, in the vicinity of the magnetic assembly, also assists these leakages of magnetic flux, since the lateral face, in the location of the head end, is close to the magnetic assembly and to the other claw which is opposite it. In this FIG. 1a, 119 shows the chamfers for connection of the foot of the claw with axial orientation (with no reference) to the radial projection (with no reference) derived from the edge of the flange of the magnet wheel concerned. The claws with axial orientation form together with their associated radial projection claws themselves, with the spaces between the radial projections being globally in the form of a "V" with a flat top. For further details reference will be made to document FR 2 676 873, and in particular to FIGS. 2 and 3 of this document. Since the magnet wheels are similar to those in this document FR 2 676 873, the anti-noise chamfers of each magnet wheel at the level of the chamfer 119 have been given the reference 120.

In order to prevent these leakages, other solutions according to the prior art, as represented in FIG. 1b, propose a solution wherein the magnetic assembly fills the interpolar space entirely. A solution of this type is satisfactory for preventing leakages of magnetic flux, but is not satisfactory from an economical point of view.

In a competitive industrial context, it is important for the technical solutions to be as economical as possible. However the magnetic assembly comprising an interpolar magnet is an object made of a material which is increasingly expensive, all the more so since it generally involves a rare earth magnet, the cost of which is increasing continually. In these conditions, in order to limit the costs, it appears necessary to limit the size of the magnets.

SUMMARY OF THE INVENTION

In this context, the problem posed here consists of providing a rotor of a rotary electrical machine which has a simple structure, and which, in the phase when the rotor is operating, makes it possible to limit the leakages of magnetic flux, whilst providing an economically advantageous rotor.

The solution proposed by the present invention is characterised in that the said lateral faces of each of the first and second claws define a decrease in the cross-section starting from one of the free ends of the said magnetic assembly, in order to develop towards a head end of the claw, according to a lateral facet.

A rotor of this type makes it possible to eliminate the aforementioned disadvantages.

The present solution provides a good compromise. In fact, it makes it possible to minimise the leakage paths between the head ends of the first and second magnet wheels, and to decrease the costs by reducing the size of the interpolar magnets.

The decrease in the cross-section, which a priori is non-linear, of each of the first and second claws, starting from one of the ends of the magnet, has a favourable effect on the path followed by the magnetic field lines.

The magnetic assembly which is disposed in the polar space has the function of guiding the field lines in the air gap, between the first and second claws. These lines, which connect the magnetic poles defined by the magnet wheels, run along parallel straight lines which have the same spacing when they pass into the interpolar magnet. In the vicinity of the free ends of the magnetic assembly, existing leakage paths are influenced by the form defined by each of the claws.

By decreasing the cross-section of the first and second claws starting from the free ends of the magnetic assembly, the field lines which exist between the first and second claws, and define leakage paths, will be extended; they then a priori define curved trajectories which should have a radius of curvature which is relatively smaller, thus extending the magnetic path which must be travelled from one magnet wheel towards the other magnet wheel.

Instead of following these aforementioned field lines, the field lines will then, by obeying the rules of magnetism, follow a magnetic path which is shorter and passes via the magnetic assembly disposed in the interpolar space. Thus, the magnetic fluxes which would be dissipated in the air in the vicinity of the ends of the magnetic assembly by applying the solutions described in the prior art, are then advantageously retained by modifying their trajectory via the form of the first and second claws.

This decrease in the losses consequently makes it possible to increase the performance of the rotary electrical machine. By way of example, a motor vehicle alternator equipped with a rotor of this type provides improved performance, and thus produces more current.

According to one embodiment, the rotor additionally comprises a second magnetic assembly in the interpolar space defined between the first claw and a third claw, the said second and third claws being two consecutive claws of the second magnet wheel.

The arrangement of a second magnetic assembly makes it possible to limit the leakage paths of the magnetic flux on the other side of the first claw, on the side of the third claw. By this means, the losses of magnetic flux between this first claw and the second magnet wheel are advantageously reduced.

According to another embodiment of the invention, the two lateral facets of a single claw are connected by an end facet, such that the head end of this claw defines a substantially symmetrical form.

The symmetrical nature of the claw head permits simpler cooperation between the first and second claws, and consequently makes it possible to simplify the design and the industrialisation of a rotor of this type.

According to another embodiment of the invention, the lateral facet is developed towards the head end, parallel to the lateral face.

The arrangement of a lateral facet parallel to the lateral face permits easy implementation, since this can be performed by the same tools, and thus provide optimised production costs.

According to another embodiment of the invention, the decrease in the cross-section defines a straight shoulder which separates the lateral facet from the lateral face.

The arrangement of a straight shoulder between the lateral facet and the lateral face advantageously makes it possible to decrease the cross-section starting from one of the free ends of the magnetic assembly. A straight shoulder of this type mainly has the advantage that it is simple to produce, and therefore provides an inexpensive production method for reduction of the cross-section of the claw.

According to yet another embodiment of the invention, the decrease in the cross-section defines a rounded connection fillet between the lateral facet and the lateral face.

The rounded connection fillet makes it possible to modulate the form of the claw, according for example to the form of the magnetic assembly or the claw which is adjacent to it. The connection fillet can vary in particular in terms of its radius of curvature.

According to another variant, for a single claw:
extensions of contour of the lateral faces each define two metric spaces A, B together with the contour of the lateral facet which is directly opposite;
the said extensions of contour of the lateral faces are connected according to a virtual end face with a metric width C which is partly combined with the contour of the said end facet;
the sum of the two metric spaces A, B is approximately equivalent to a level T1 of between 15 and 45% of the value of the said width C.

All of these numerical characteristics provide an excellent compromise between the decrease in the losses of magnetic flux and the saving of material relating to the reduction in the size of the magnetic assemblies, in particular when a rounded connection fillet is involved.

According to another variant, the length of a lateral facet is approximately equivalent to a level T2 contained between 15 and 45% of a length of the claw, defined between the head end and the base of the claw, and measured according to the direction defined by the lateral facet.

All of these numerical characteristics also provide an excellent compromise between the decrease in the losses of magnetic flux and the saving of material relating to the reduction in size of the magnets, in particular when a straight shoulder is involved.

According to another embodiment of the invention, the level T1 is substantially equal to 30%.

According to another embodiment of the invention, the level T2 is substantially equal to 30%.

According to another embodiment of the invention, the magnetic assembly comprises a magnet made of rare earth.

Rare earth magnets are those which have the most powerful magnetic properties. It is particularly advantageous to use a material of this type in order to minimise as far as possible the losses of magnetic flux.

A second object of the invention is also an alternator, in particular of a motor vehicle, equipped with a rotor of a rotary electrical machine as previously defined.

When equipped with a rotor of this type, the alternator has improved performance, and consequently produces more current intensity. In addition, the head end of a claw of one of the magnet wheels can be extended axially in the direction of the flange of the other magnet wheel, or can even penetrate partly in the space delimited by the two radial projections concerned of the other magnet wheel, since the magnetic leakages are decreased.

All of the aforementioned characteristics can be taken into consideration alone or in combination.

Other characteristics and advantages will also become apparent from the description provided hereinafter by way of example which is in no way limiting, with reference to the accompanying drawings.

DETAILED DESCRIPTION

Figure 1A:
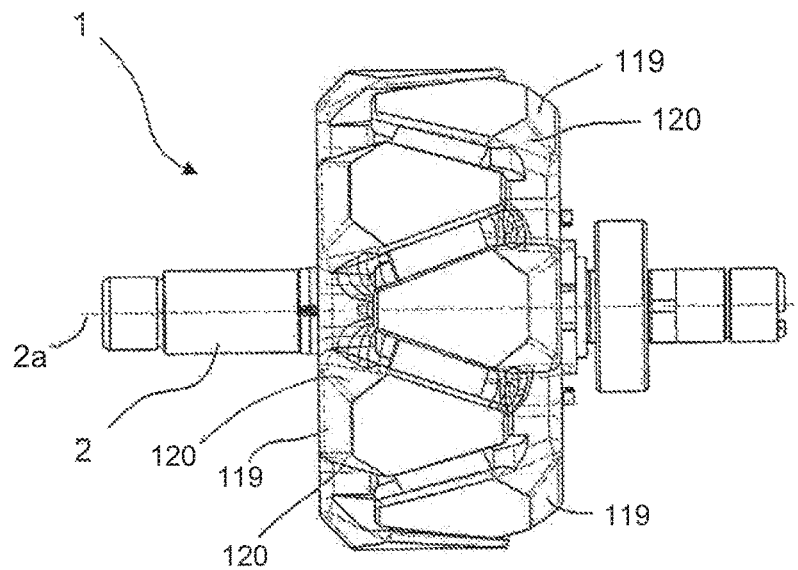
FIG. 1a shows a rotor according to the prior art, wherein the lateral faces of each of the first and second claws define a cross-section which decreases linearly, irrespective of the proximity of the magnet which is adjacent to them.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "integral" (or "unitary") relates to a part made as a single part, or a part made of separate components fixedly connected together. Additionally, the word "a" and "an" as used in the claims means "at least one" and the word "two" as used in the claims means "at least two".

Figure 1B:
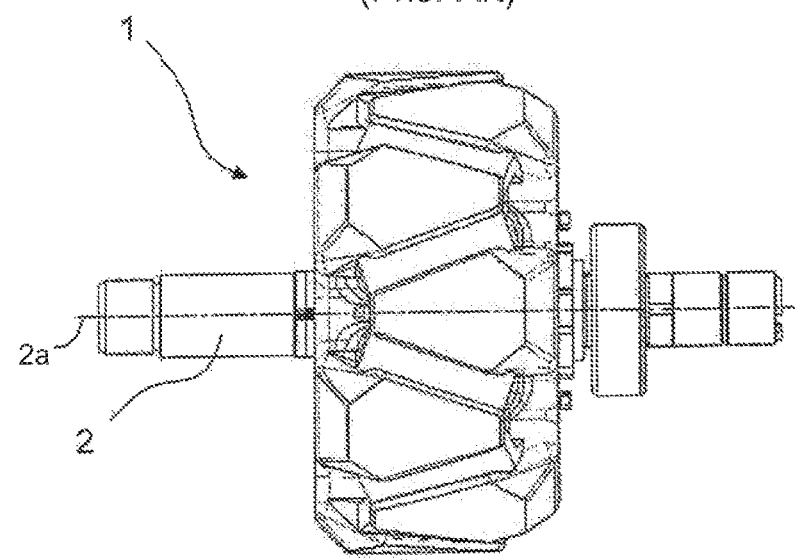
FIG. 1b shows another rotor according to the prior art, wherein the interpolar magnet fills all of the interpolar space.
Figure 2:
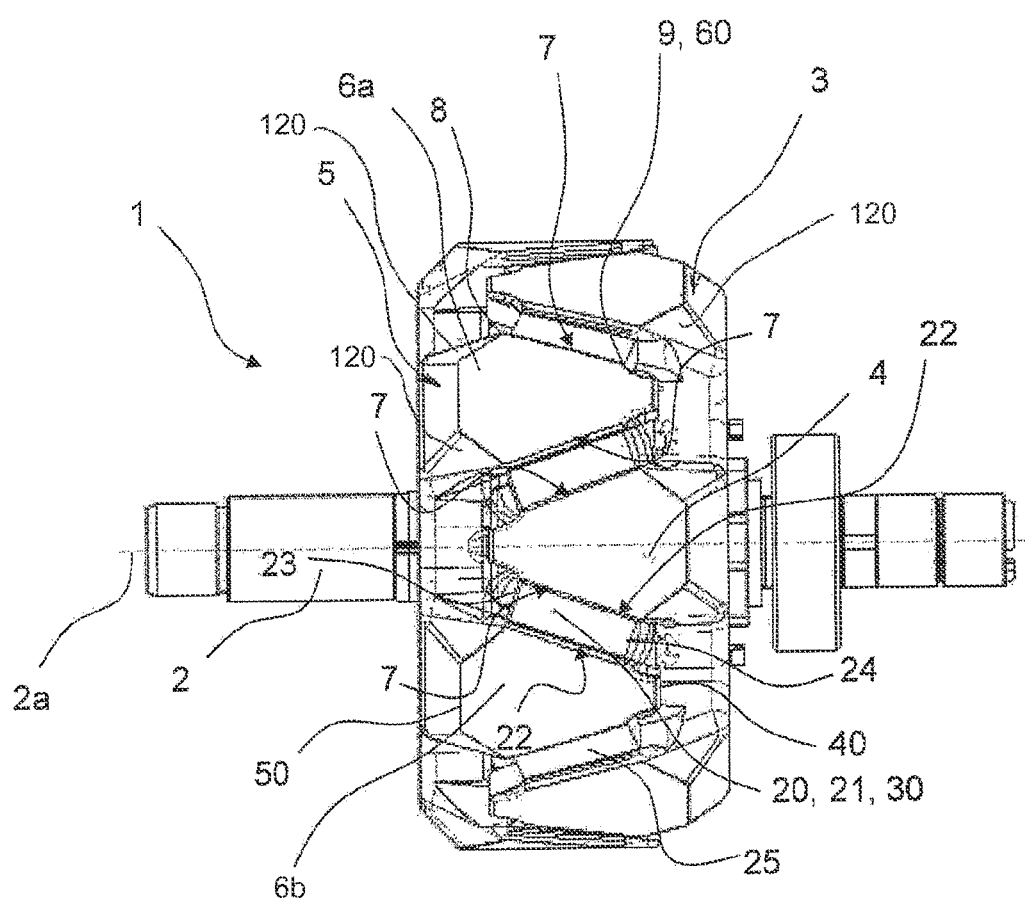
FIG. 2 shows a lateral view of an example of a rotor according to the present invention.

In the present embodiment in FIG. 2 according to the invention, the alternator or alternator-starter of a motor vehicle comprises a conventional housing and stator, not illustrated, and a claw rotor 1 with a shaft 2 with an axis 2a. In a known manner, the rotor 1 comprises a coil or winding (not illustrated), wires of which are supported and positioned by capstans at the level of a section of wire which projects from the winding, and is also connected to a collector, not illustrated, of the alternator. For further details, reference will be made for example to document FR 2 676 873 which in FIG. 1 discloses the complete structure of the alternator, in this case with internal ventilation, and also to FIG. 1 of document FR 2 793 085 which shows the excitation winding of the rotor. FIGS. 1 to 3 show at the rear the two collector rings of the collector, as well as the ball bearing for fitting with rotation of the rotor shaft, the said bearing being fitted in a receptacle in the rear flange, also known as the rear bearing, which the housing comprises.

In the description, the orientations transverse and radial will be made with reference to the axis 2a of the shaft 2.

The rotor 1 in FIG. 2 comprises two magnet wheels, preferably made of ferromagnetic material. Each magnet wheel comprises a flange with orientation which is transverse relative to the axis 2a, and a series of claws which are implanted on the outer periphery of the flange concerned. In a known manner, the claws comprise a part with radial orientation and a part with axial orientation. The radial part extends projecting radially relative to the edge of the flange concerned, i.e. relative to the outer periphery of the flange concerned. The flange has a globally transverse orientation. The part of the claws with axial orientation is in the form of a tooth with a globally trapezoidal form. Each tooth, and thus each claw, extends axially relative to the axis 2a, from the radial projection derived from the outer radial end edge of the flange of the said magnet wheel, in the direction of the other magnet wheel, such that each claw of a magnet wheel is situated in a space existing between two consecutive claws of the other magnet wheel. The outer periphery of the teeth (and thus of the claws) delimits the outer periphery of the rotor and the air gap between the rotor and the stator. The thickness of the axial part of a claw decreases. The thickness of the axial part of the claw is maximum at the level of its foot end, belonging to its area of rooting on its axial part, and minimum at the level of its head end, constituting its free end. A core is interposed between the two magnet wheels. This core supports the excitation winding of the rotor, which, when a current passes through it, makes it possible to polarise the magnet wheels, one of the wheels then having north poles and the other wheel having south poles. For further information, reference will be made to FIGS. 2 and 3 of the aforementioned document FR 2 676 873, showing in perspective and at the end, one of the magnet wheels and the space between two claws of a single magnet wheel, and to document FR 2 793 085 showing the core of the claw rotor. In a known manner this core can be distinct from the magnet wheels, or, as a variant, as described in document FR 2 256 572, it can be made in two parts, each of which is integral with one of the magnet wheels. In the embodiment in FIG. 2, the teeth have anti-noise chamfers (with the references 120) at the level of their end foot, as in document FR 2 676 873. They have the same form as those in FIGS. 1a and 1b.

Thus, the rotor 1 comprises a first magnet wheel 3 and a second magnet wheel 5, each of which has a plurality of claws. The first magnet wheel 3 comprises a series of claws, each of which has a tooth 4 with axial orientation on its outer periphery, and the second magnet wheel 5 comprises a second series of claws, each of which has a tooth 6a with axial orientation on its outer periphery. Each of the first and second teeth 4, 6a, and therefore each first and second claw 4, 6a has at least two opposite lateral faces 7 (preferably two opposite lateral faces 7), a claw head end (or free end) 40 of the claw, and lateral facets 12 between the claw head end 40 and the lateral faces 7. Each of the first and second teeth 4, 6a has one (out of the at least two) lateral face, such that the lateral face 7 adjacent to the other tooth of the other claw is opposite. The lateral face 7 comprises third and fourth opposite ends 8, 9, between which a magnetic assembly 20 is typically in contact. The fourth end 9 is closest to the free end, or head, of the claw 4, 6a concerned, whereas the third end 8 is closest to the flange of the magnet wheel concerned. In this embodiment, the third end 8 is delimited globally by an anti-noise chamfer 120, and belongs to the foot end of the claw.

The magnetic assembly 20, comprising at least one permanent interpolar magnet 21, is placed circumferentially between a first and a second tooth 4, 6a. The magnetic assembly 20 can also comprise another magnet and/or a magnetic element (not illustrated), which can be made of the same material as the magnet wheels, or it can be made of steel, as described for example in document FR 2 918 220, to which reference will be made.

The magnet can also be associated with a laminate glued onto the magnet, as described in document FR 2 784 248, to which reference will be made.

It will be appreciated that the magnetic assembly 20 can comprise at least one magnet, at least one support wedge which is made of a non-magnetic material, and is fitted on a transverse end face of the magnet, and means for connection with the wedge, as described in document FR 2 895 165, to which reference will be made.

Preferably, in order to fit the magnetic assembly 20 on the claws, grooves are provided in the sides (the lateral faces) of the claws. A method for fitting a magnetic assembly 20 of this type between these first and second claws 4, 6a is described for example in applications FR 2 784, 248, FR 2 918 220 and FR 2 895 165. It will be appreciated that the thickness of the axial part of a claw depends on the thickness of the magnetic assembly 20.

The magnetic assembly 20 has a substantially parallelepiped form, but it is conceivable for this form to be adapted according to the form of the interpolar space 30 defined between the first and second claws 4, 6a. A priori, the magnetic assembly 20 has a homogenous appearance with substantially flat faces.

According to one embodiment, the magnetic assembly 20 is contained in the interpolar space 30 defined between the first claw 4 of the first magnet wheel 3, and the second claw 6a of the second magnet wheel 5. The magnetic assembly 20 then comprises laterally two first faces 22 (which are preferably opposite), delimited by first and second free ends 23, 24. "Free end" means an end which is not in contact with one or the other of the claws. The first two faces 22 of the magnetic assembly 20 extend respectively along first and second claws 4, 6a, which are preferably opposite lateral faces of the claws.

FIG. 2 shows that the magnetic assembly 20 is placed between the first and second claws 4, 6a, such that it does not project relative to the third and fourth ends 8, 9 of the lateral faces 7 of each of the claws 4, 6a. By way of example, the size of the magnetic assembly 20 is thus reduced relative to the magnetic assembly represented in figure 1b. In other words, the magnetic assembly 20 is disposed between the third and fourth ends 8, 9 of the lateral faces 7 of each of the claws 4, 6a, and does not project beyond the third and fourth ends 8, 9 of the lateral faces 7 of each of the claws 4, 6a, as illustrated in FIG. 2.

Figure 3A:
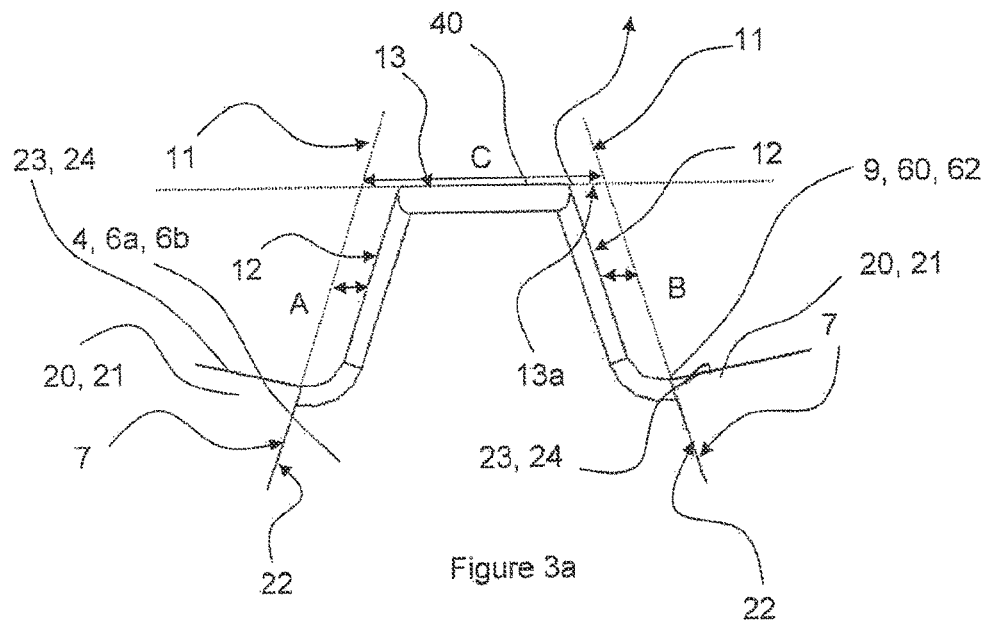
FIG. 3a is a top view of a claw according to an embodiment of the present invention, showing sloped lateral facets and a decrease in the cross-section defining a rounded connection fillet between the sloped lateral facet and the lateral face.
Figure 3B:
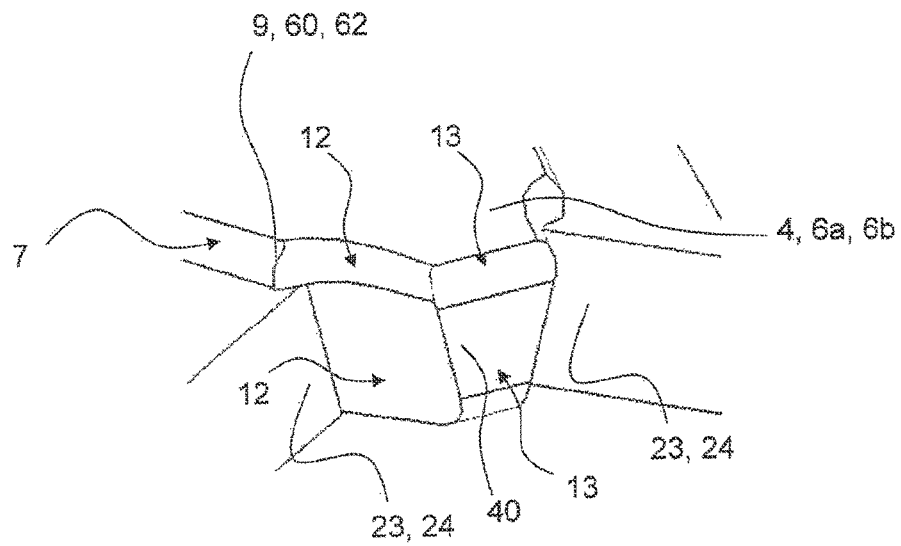
FIG. 3b shows substantially the same details as FIG. 3a, in a view in perspective.

The lateral faces of each of the first and second claws 4, 6a thus define a decrease in the cross-section 60 of each of the first and second claws 4, 6a, starting from one of the free ends 23, 24 of the magnetic assembly 20, in order to develop towards the claw head end, or free end, 40, according to a sloped lateral facet 12, as best shown in FIGS. 3a and 3b. The lateral facets 12 of each of the first and second claws 4, 6a are sloped relative to radially outer surfaces of each of the first and second claws 4, 6a, as best shown in FIGS. 3a and 3b. In other words, each of the first and second claws 4, 6a defines a decrease in the cross-section 60 of each of the first and second claws 4, 6a between the lateral face of each of the first and second claws 4, 6a and the sloped lateral facet 12 starting from one of the free ends 23, 24 of the magnetic assembly 20 (in particular of its magnet 20), in order then to extend towards the claw head end 40, the decrease in the cross-section 60 is followed by the sloped lateral facet 12. It should also be specified that, taking into account the generally trapezoidal form of the claw, according to the view shown in FIG. 2, "decrease in the cross-section starting from one of the free ends 23, 24 of the magnetic assembly 20" means the fact that, as shown in FIG. 2, the cross-section of the claw defines a non-linear reduction in the cross-section starting from the free end of the magnetic assembly 20. This non-linear reduction in the cross-section a priori defines a discontinuity of cross-section. Thus, one of the free ends of a magnetic assembly 20 extends axially recessed relative to the head of the claw 4, whereas the other free end of a magnetic assembly extends axially recessed relative to the head of the claw 6a. The length of a magnetic assembly 20 is thus reduced.

Figure 4A:
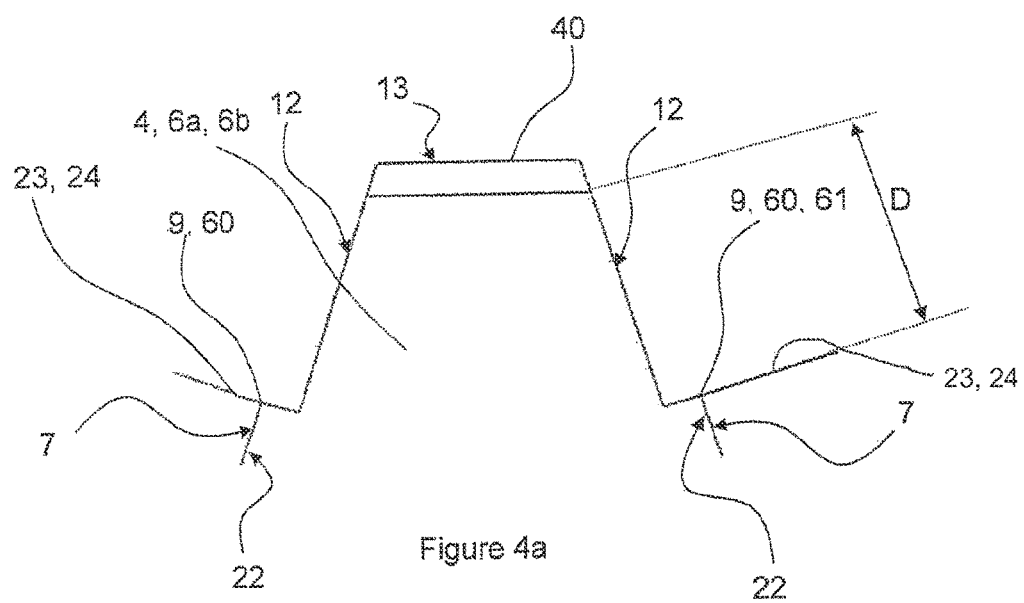
FIG. 4a shows a sectional view of a claw according to another embodiment of the present invention in the direction perpendicular to the axis of the shaft of the rotor, wherein the decrease in the cross-section defines a straight shoulder which separates the lateral facet from the lateral face.
Figure 4B:
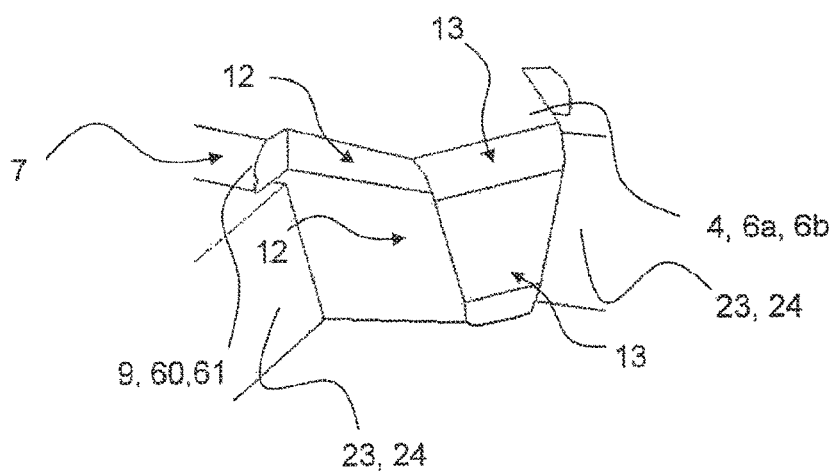
FIG. 4b shows substantially the same details as FIG. 4a, in a view in perspective.

According to a first embodiment shown in FIGS. 4a and 4b, the decrease in the cross-section 60 defines a straight shoulder 61 which separates the lateral facet 12 from the lateral face 7.

According to a second embodiment shown in FIGS. 3a and 3b, the decrease in the cross-section 60 defines a rounded connection fillet 62 between the lateral facet 12 and the lateral face 7.

According to one embodiment, the magnetic assembly 20 comprising the magnet 21 is accommodated in the interpolar space 30 between the first and second claws 4, 6a, and is received by its first faces 22 in grooves provided in the lateral faces of each of the claws which are opposite. Document FR 2 793 085 shows for example a method for fitting the magnetic assembly 21 in the interpolar space 30, this method being implemented by means of a milling cutter in order to create the grooves, which partly notch the radial part of the claws.

According to another embodiment shown in FIG. 2, the rotor 1 additionally comprises a second interpolar magnetic assembly 25 in the interpolar space 30 defined between the first claw 4 and a third claw 6b of the magnet wheel 5. The second and third claws 6a, 6b are two consecutive claws which equip the same second magnet wheel 5.

A magnetic assembly pair 20, 25 is thus formed.

The number of magnetic assembly pairs 20, 25 can be equal to, or less than, the number of pairs of poles of the magnet wheels.

Subsequently, persons skilled in the art can arrange magnetic assemblies of the same type as those previously described, such that a series of magnetic assemblies is disposed between each interpolar space 30 defined between the series of first claws 4 and the series of second claws 6a.

According to embodiments shown in FIGS. 3a, 3b, 4a, and 4b, the two lateral facets of a single claw are connected by an end facet 13, such that the head end 40 of a claw defines a substantially symmetrical form.

According to another variant, examples of which are shown in FIGS. 3a, 3b, 4a, and 4b, the lateral facet 12 extends towards the head end 30 parallel to the lateral face 7.

As illustrated in FIGS. 3a and 3b, the following can apply for a single claw:
- extensions of contour 11 of the lateral faces each define two metric spaces A, B with the contour of the lateral facet 12 which is directly opposite;
- the said extensions of contour 11 of the lateral faces are connected according to a virtual end face 13a with a metric width C which is partly combined with the contour of the said end facet 13;
- the sum of the two metric spaces A, B is approximately equivalent to a level T1 contained between 15 and 45% of the value of the said width C.

Preferably, the level T1 is substantially equal to 30%.

According to another embodiment shown for example in FIGS. 4a and 4b, the length of a lateral facet 12 is approximately equivalent to a level T2 contained between 15 and 45% of a length of the claw 4, 6a, which is defined between the head end 40 and the base 50, and is measured according to the direction defined by the lateral facet 12. Preferably, the level T2 is substantially equal to 30%.

According to one embodiment, the magnetic assembly 20 comprises at least one permanent magnet 21 made of ferrite.

According to another embodiment, the magnetic assembly 20 comprises at least one permanent magnet made of rare earth.

It will be appreciated that one of the magnetic assemblies can comprise at least one permanent magnet made of rare earth, and the other, consecutive magnetic assembly can comprise at least one permanent magnet made of rare earth.

As a variant, the magnets can be retained in place by retention elements which are made of magnetic material and are in the form of a "C", as described in patent U.S. Pat. No. 7,420,314. As a variant, this retention element can be in the form of a clip.

According to a second object of the present invention, an alternator, in particular of a motor vehicle, is equipped with a rotor 1 of a rotary machine as defined according to one of the preceding combinations.

The alternator can be reversible, and consist of an alternator-starter, which in particular makes it possible to start the thermal engine of the vehicle. As is known, the claw rotor of an alternator comprises 6 to 8 claws and thus 6 to 8 poles per magnet wheel.

It will be remembered that the conventional alternators for motor vehicles have a stator outer diameter contained between 110 and 150 mm, and a claw rotor outer diameter contained between 78 and 112 mm. The length of the stator body is contained between 26 and 42 mm. For good power of the alternator, this stator body has a length greater than that of the core of the claw rotor. For alternators with lower power, the length of the core of the rotor is greater than that of the stator body. The ratio of the outer diameter of the core to the outer diameter of the rotor is contained between 0.5 and 0.6. The thickness of the flanges of the wheels 7, 8 is less than half the length of the core of the rotor. The thickness of the claws 9 at the level of their end for connection to the projections 19 is globally equal to the thickness of the flanges of the wheels 7, 8. For further details, reference will be made for example to document EP 0 881 756.

With reference to document EP 1 362 404, it can be seen that the axial length of overlapping of the magnet relative to the claws is reduced. The height of the head of the claw can be reduced.

The invention claimed is:

1. A rotor (1) for a rotary electrical machine, the rotor comprising:
   a first magnet wheel (3); and
   a second magnet wheel (5);
   each of the first and second magnet wheels comprising a series of claws with axial orientation and a globally trapezoidal form;
   the claws extend axially from a radial projection of an outer radial end edge of each of the magnet wheel in the direction of the other magnet wheel such that each claw of each of the magnet wheels is situated between two consecutive claws of the other magnet wheel;
   an interpolar space (30) is defined between each two consecutive claws of the rotor (1); and
   a magnetic assembly (20) disposed in the interpolar space (30) defined between a first claw (4) of the first magnet wheel (3) and a second claw (6a) of the second magnet wheel (5);
   the magnetic assembly (20) comprising laterally two first faces (22) delimited by first and second free ends (23, 24) of the magnetic assembly (20), the two first faces (22) extending respectively along first and second claws (4, 6a);
   each of the first and second claws (4, 6a) having a claw head end (40), opposite lateral faces (7) and sloped lateral facets (12) between the claw head end (40) and the lateral faces (7), each of the lateral faces (7) comprising third and fourth opposite ends (8, 9) between which the magnetic assembly (20) is in contact so that the magnetic assembly (20) does not project beyond the third and fourth ends (8, 9) of the lateral face (7) of each of the first and second claws (4, 6a);
   the lateral faces of each of the first and second claws (4, 6a) define a non-linear decrease in the cross-section (60) of each of the first and second claws (4, 6a) between the lateral face of each of the first and second claws (4, 6a) and the sloped lateral facet (12) starting from one of the free ends (23, 24) of the magnetic assembly (20) in order then to extend towards the claw head end (40) of the claw, the decrease in the cross-section (60) followed by the sloped lateral facet (12).

2. The rotor (1) according to claim 1, further comprising a second magnetic assembly (25) in the interpolar space (30) defined between the first claw (4) and a third claw (6b), the second and third claws (6a, 6b) being two consecutive claws of the second magnet wheel (5).

3. The rotor (1) according to claim 2, wherein the two sloped lateral facets of one of the claws are connected by a sloped end facet (13), such that the claw head end (40) of the claw defines a substantially symmetrical form.

4. The rotor (1) according to claim 1, wherein the sloped lateral facet (12) extends towards the claw head end (40), parallel to the lateral face (7).

5. The rotor (1) according to claim 1, wherein the decrease in the cross-section (60) defines a straight shoulder (61) which separates the sloped lateral facet (12) from the lateral face (7).

6. The rotor (1) according to claim 1, wherein the decrease in the cross-section (60) defines a rounded connection fillet (62) between the sloped lateral facet (12) and the lateral face (7).

7. The rotor (1) according to claim 1, wherein a length of each of the sloped lateral facets (12) is between 15 and 45% of a length of the claw defined between the claw head end (40) and the base (50) of the claw, and measured according to the direction defined by the lateral facet (12).

8. The rotor (1) according to claim 7, wherein the length of each of the sloped lateral facets is substantially equal to 30% of a length of the claw.

9. The rotor (1) according to claim 1, wherein the magnetic assembly (20) comprises a magnet (21) made of rare earth.

10. An alternator-comprising a rotor (1) as defined in claim 1.

11. The rotor (1) according to claim 2, wherein the sloped lateral facet (12) is developed towards the claw head end (40), parallel to the lateral face (7).

12. The rotor (1) according to claim 3, wherein the sloped lateral facet (12) is developed towards the claw head end (40), parallel to the lateral face (7).

13. The rotor (1) according to claim 2, wherein the decrease in the cross-section (60) defines a straight shoulder (61) which separates the sloped lateral facet (12) from the lateral face (7).

14. The rotor (1) according to claim 3, wherein the decrease in the cross-section (60) defines a straight shoulder (61) which separates the sloped lateral facet (12) from the lateral face (7).

15. The rotor (1) according to claim 4, wherein the decrease in the cross-section (60) defines a straight shoulder (61) which separates the sloped lateral facet (12) from the lateral face (7).

16. The rotor (1) according to claim 2, wherein the decrease in the cross-section (60) defines a rounded connection fillet (62) between the sloped lateral facet (12) and the lateral face (7).

17. The rotor (1) according to claim 3, wherein the decrease in the cross-section (60) defines a rounded connection fillet (62) between the sloped lateral facet (12) and the lateral face (7).

18. The rotor (1) according to claim 4, wherein the decrease in the cross-section (60) defines a rounded connection fillet (62) between the sloped lateral facet (12) and the lateral face (7).

19. The rotor (1) according to claim 1, wherein the decrease in a cross-section of the first and second claws (4, 6a) is non-linear in the direction toward the claw head end (40).

20. A rotor (1) for a rotary electrical machine, the rotor comprising:
    a first magnet wheel (3); and
    a second magnet wheel (5);
    each of the first and second magnet wheels comprising a series of claws with axial orientation and a globally trapezoidal form;
    the claws extend axially from a radial projection of an outer radial end edge of each of the magnet wheel in the direction of the other magnet wheel such that each claw of each of the magnet wheels is situated between two consecutive claws of the other magnet wheel;
    an interpolar space (30) is defined between each two consecutive claws of the rotor (1);
    a magnetic assembly (20) disposed in the interpolar space (30) defined between a first claw (4) of the first magnet wheel (3) and a second claw (6a) of the second magnet wheel (5); and
    a second magnetic assembly (25) in the interpolar space (30) defined between the first claw (4) and a third claw (6b), the second and third claws (6a, 6b) being two consecutive claws of the second magnet wheel (5);
    the magnetic assembly (20) comprising laterally two first faces (22) delimited by first and second free ends (23, 24) of the magnetic assembly (20), the two first faces (22) extending respectively along first and second claws (4, 6a);
    each of the first and second claws (4, 6a) having a claw head end (40), opposite lateral faces (7) and lateral facets (12) between the claw head end (40) and the lateral faces (7), each of the lateral faces (7) comprising third and fourth opposite ends (8, 9) between which the magnetic assembly (20) is in contact so that the magnetic assembly (20) does not project beyond the third and fourth ends (8, 9) of the lateral face (7) of each of the first and second claws (4, 6a);
    the lateral faces of each of the first and second claws (4, 6a) define a decrease in the cross-section (60) of each of the first and second claws (4, 6a) between the lateral face of each of the first and second claws (4, 6a) and the lateral facet (12) starting from one of the free ends (23, 24) of the magnetic assembly (20) in order then to extend towards the claw head end (40) of the claw, the decrease in the cross-section (60) followed by the lateral facet (12);
    the two lateral facets of one of the claws are connected by an end facet (13), such that the claw head end (40) of the claw defines a substantially symmetrical form;
    wherein, for a single claw:
        extensions of contour (11) of the lateral faces each define two metric spaces (A, B) together with the contour of the lateral facet (12) which is directly opposite;
        the extensions of contour (11) of the lateral faces are connected according to a virtual end face (13a) with a metric width C which is partly combined with the contour of the end facet (13);
        the sum of the two metric spaces (A, B) is between 15 and 45% of the value of the width C.

21. The rotor (1) according to claim 20, wherein the sum of the two metric spaces (A, B) is substantially equal to 30% of the value of the width C.

* * * * *